United States Patent
Oddo et al.

(10) Patent No.: US 6,722,967 B1
(45) Date of Patent: Apr. 20, 2004

(54) FLOATING SANDER DEVICE

(75) Inventors: Ronald Alan Oddo, Lancaster, CA (US); John Charles Firm, Palmdale, CA (US); Kenneth Scott Corkill, Lancaster, CA (US); Coyte Richard Jones, Lancaster, CA (US); Ronald EuGene Roche, Phelan, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 0 days.

(21) Appl. No.: 10/267,165

(22) Filed: Oct. 9, 2002

(51) Int. Cl.[7] .................................................. B24B 7/18
(52) U.S. Cl. ...................... 451/353; 451/519; 451/486; 451/354; 451/484
(58) Field of Search .................. 451/353, 519, 451/486, 514, 354, 484, 485; 15/49.1, 98, 144.1–4, 236.01

(56) References Cited

U.S. PATENT DOCUMENTS

| | | | | |
|---|---|---|---|---|
| 2,168,121 A | * | 8/1939 | French | 15/144.1 |
| 4,731,956 A | * | 3/1988 | Wood | 451/353 |
| 5,048,141 A | * | 9/1991 | Huppi | 15/49.1 |
| 5,333,349 A | * | 8/1994 | Lister | 15/235.8 |
| 5,481,776 A | * | 1/1996 | Briscoe | 15/49.1 |
| 5,624,305 A | * | 4/1997 | Brown | 451/354 |
| 5,951,781 A | * | 9/1999 | Lucas | 134/6 |
| 6,053,805 A | * | 4/2000 | Sanchez | 451/456 |

FOREIGN PATENT DOCUMENTS

DE 362251 * 10/1922 .................. 15/144.1

* cited by examiner

*Primary Examiner*—George Nguyen
(74) *Attorney, Agent, or Firm*—Stetina Brunda Garred & Brucker

(57) ABSTRACT

A resilient sanding mechanism is provided for sanding the contours of a working surface, such as an aircraft body. The mechanism comprises an elongate frame having a frame axis, a sander mechanism pivotally engaged to the frame and having a sanding surface disposed distal to the frame. A resilient biasing apparatus is engageable to the sander mechanism and to the frame, for biasing the sander mechanism sanding surface in a predetermined orientation with respect to the frame axis.

17 Claims, 3 Drawing Sheets

FLOATING SANDER DEVICE

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention relates to sanding devices and, more particularly, to a floating head sanding device useful to provide precision finishes to a product surface.

BRIEF SUMMARY OF THE INVENTION

Sanders have a wide variety of applications extending from everyday home use to aerospace applications for composite technologies, or for use on fiberglass boat holes. Particular types of products and materials may require more of a precision finish to achieve optimum functionality. The size and shape of the product may also dictate types of sanders, the type of finish, etc. Sanding techniques may also very in accordance with the nature of the product, materials or desired finish.

In some cases large products may require the use of automated hand sanders to achieve the desired finish. While the equipment to perform such operations is readily available, the human operation of such equipment, particulary over extended periods, can lead to injuries or disabilities to workers operating such equipment. Where, for example, the surface to be sanded is above the worker, the worker will typically hold the sander above his chest or head, supporting the weight of the sander while pressing the sander against the worker surface. The position weight and vibration of the sander can stress and pressure the worker's body in manner to cause injury over periods of such sanding activity. As many companies recognize a safe and comfortable work environment is not only in the interest of workers, but also in the interest of companies who rely upon those workers to perform skilled or touch work.

Accordingly, there exists a need to devise equipment to facilitate the extended operation of sanders without jeopardizing the health of workers or detracting from their productivity. That need is particularly acute where large product areas are to be sanded, from positions where manual support of the sander may be stressful. p In another embodiment the frame extends to the ground and may be provided with a pivotal frame support member operative to provide ground support to the sanding mechanism.

The frame may be constructed to be resiliently compressible along the length thereof, to mitigate translation of vibration to the worker, and/or to provide a resilient force urging the sander upwardly as it is placed into compression against the working surface.

The sanding mechanism may further be provided with a plurality of handles engageable to the frame at a plurality of locations along the frame. The handles may further be constructed to be rotatably engageable to the frame to facilitate convenient arrangement thereof.

DETAILED DESCRIPTION OF THE INVENTION

The present invention is described in connection with the illustrated embodiment. As such the structural features and functional attributes of the invention are set forth in connection with the particular construction of sander mechanism, sander biasing apparatus, sander pivotal support apparatus, and sander resilient axial support apparatus. However, as will be recognized by those skilled in the art, the invention may have application to a variety of other types of sander mechanisms, sander support apparatus and apparatus for maintaining a desired orientation of the sander mechanism sanding surface. Where, for example, the surface to be sanded is contoured in an irregular manner, or accessible only from restricted locations, modifications to orienting and supporting components of the invention are anticipated, within the broader aspects of the invention illustrated and described below.

Figure 1:
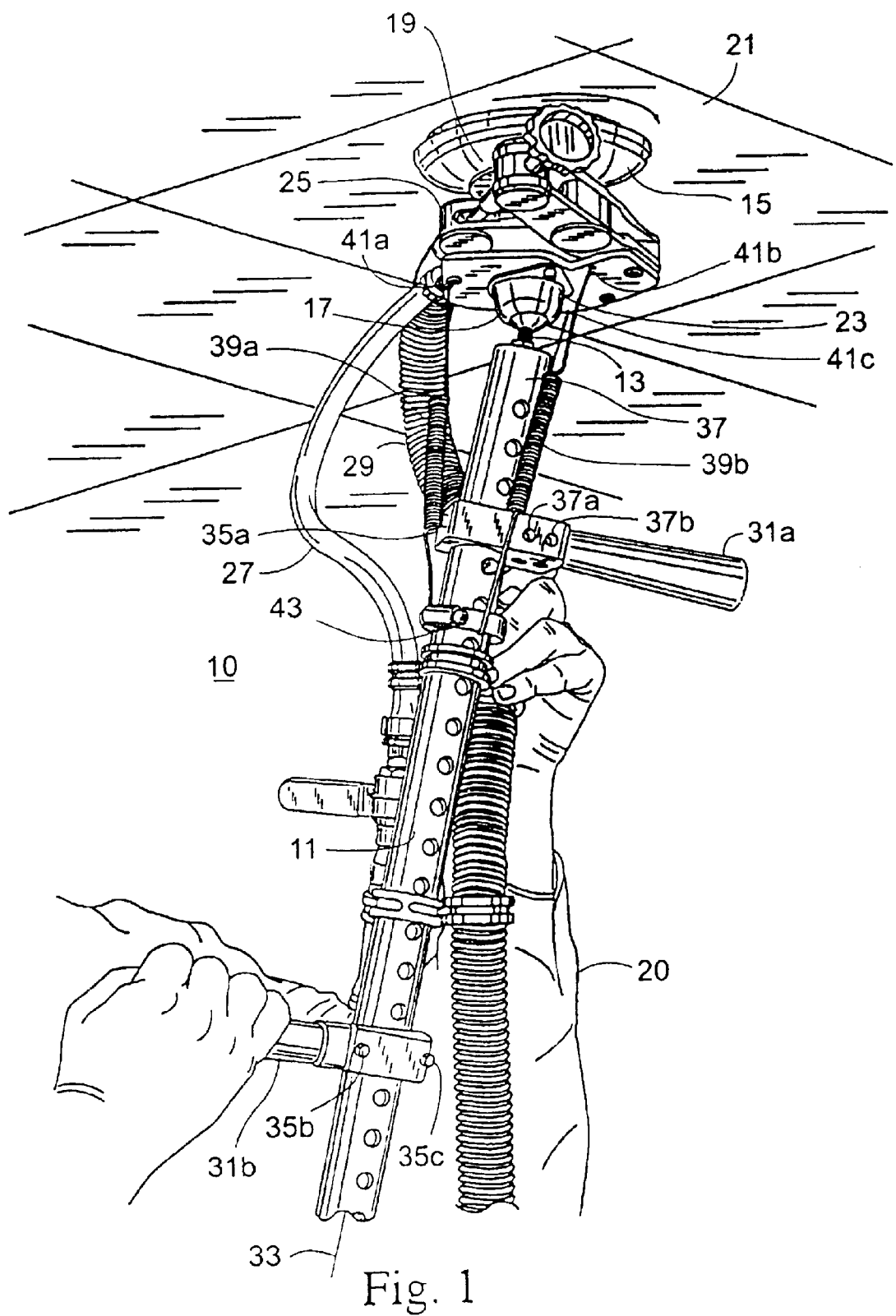
FIG. 1 is a perspective view showing one embodiment of the invention in use against the underside of a working surface.
Figure 2:
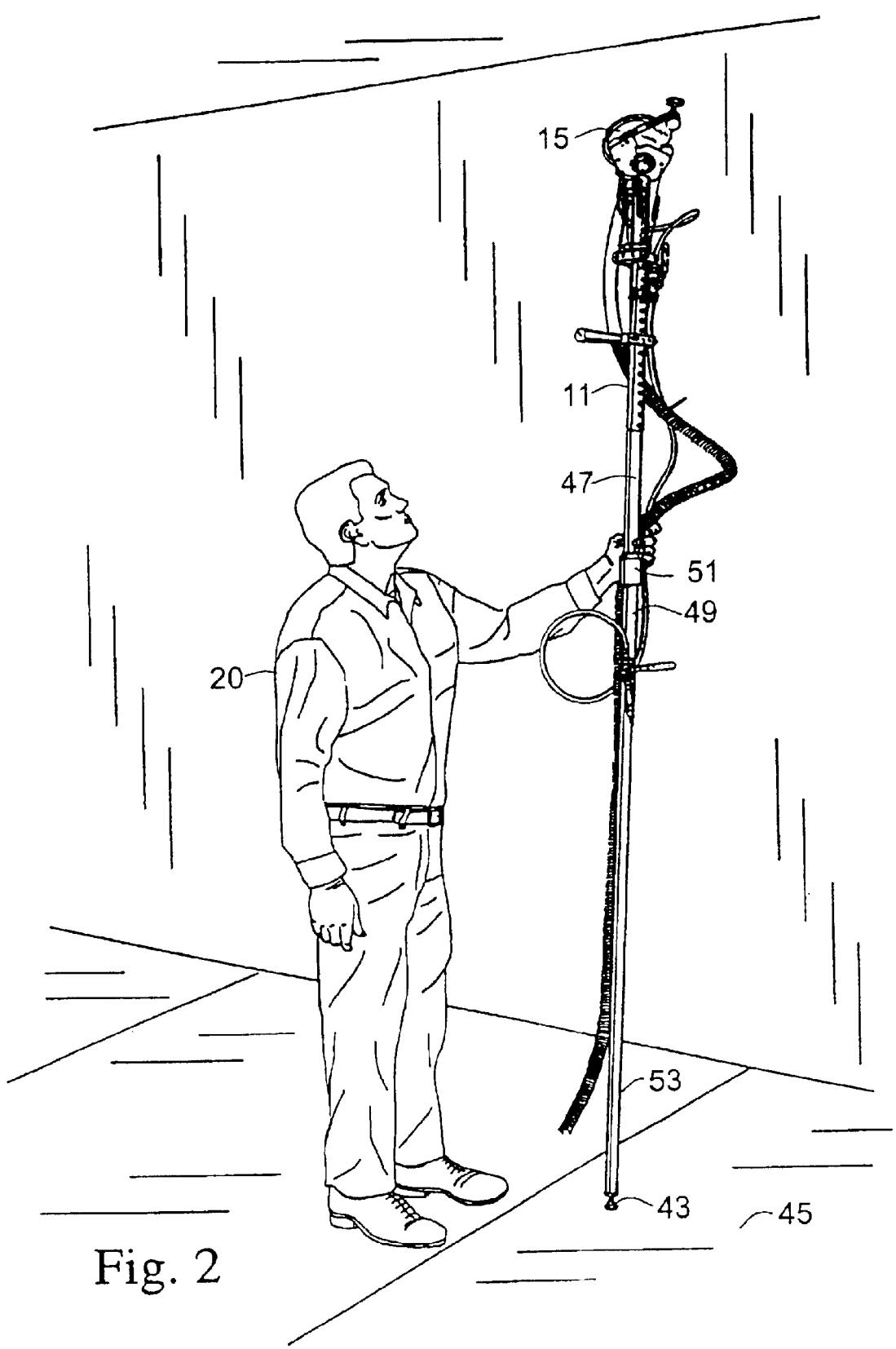
FIG. 2 illustrates a belt supported embodiment of the invention.
Figure 3:
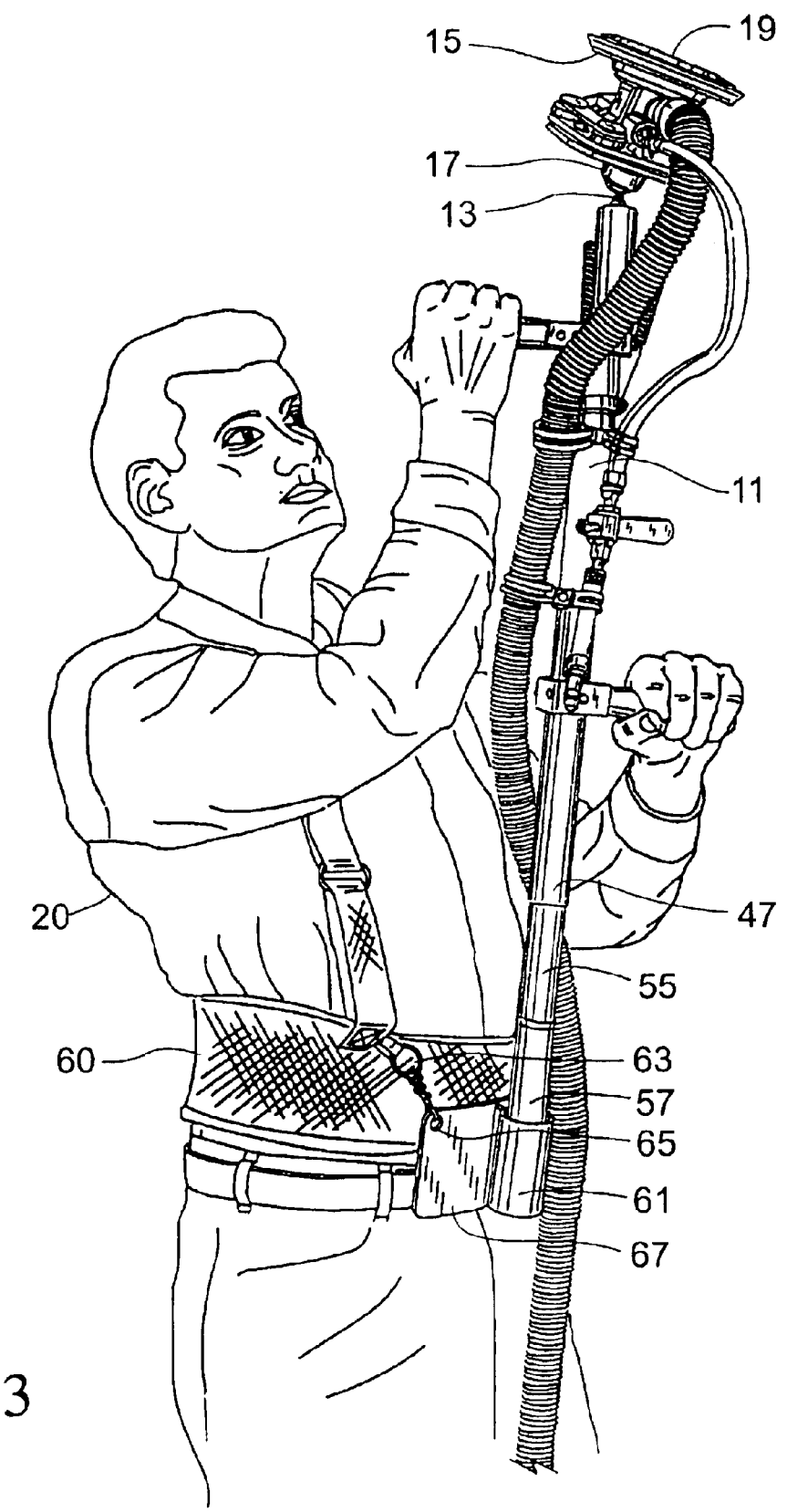
FIG. 3 illustrates a ground supported embodiment of the invention.

FIGS. 1–3 illustrates an embodiment of the sanding mechanism 10 including frame 11, and sanding mechanism 15, pivotally mounted to frame post 13 and sander pivotal support apparatus 17. It is anticipated that the frame 11 may be any of a variety of types of elongate members, such as a metallic rod or elongated member of other substantially rigid material. The sander 15 may be implemented as any of a variety of oscillating, reciprocating or vibrating sanders having a sanding surface 19 adapted for frictional engagement to the working surface 21, i.e., the sander 19 will sand the surface 21 when the sanding mechanism is urged against the working surface 21. The sanding surface 19 is disposed on the sander 15, opposite the engagement of sander 15 to post 13 and pivotal support apparatus 17.

The pivotal support apparatus 17 incorporates a support surface 23, which may be directly engageable to the sander 15, or to a sander support mechanism, such as support mechanism 25, adapted to securely engage and support the sander 15. Power to the sander 15 may be provided by means such as cable 27. Vacuum line 29 may be provided to vacuum particles separated by action of the sanding surface 19 against the working surface 21.

The sanding mechanism 10 may be directed towards the working surface 21 by means of manual manipulation of handle apparatus 31a, 31b. The handle apparatus may be oriented as convenient along the length of the frame 11, and rotatable thereabout by means of retaining fasteners 35a, b, c, extendable through apertures, such as 37a, b, to effectively clamp the handle mechanism at axially spaced locations along the frame 11.

The post 13 may be rigidly secured to a first end portion 37 of frame 11, e.g., by means of screw attachment. Alternatively, the post 13 may be supported by a resilient mechanism (not shown), such as a spring that reciprocates within frame 11, along frame axis 33. In such an embodiment, the post 13, and any supporting structure, is urged outwardly from the frame, and compressible into the frame.

The sander mechanism 15, including such sander support apparatus as may be present, is preferably biased such that the sanding surface is urged towards a predetermined orientation with respect to the frame axis 33. Resilient sander biasing apparatus 39a, b, c, which are implemented as tension springs in the illustrated embodiment, are secured to the sander support mechanism at locations 41a, b, c, respectively. Opposing ends of the springs 39a, b, c, are engageable to the frame 11 via frame coupling member 43, which is secured to a frame 11. The coupling member 43 is translatable about the frame 11 along the frame axis 33. The coupling member 43 may be disposed at a selected location along frame 11 to maintain the desired bias and orientation of sanding surface 19. As the coupling member is drawn downwardly along the frame 11, the biasing force acting on the sanding surface 19 will become greater (stiffer), requiring more force to overcome the predetermined orientation of sanding surface 19. In the presently preferred embodiment the sanding surface 19 is biased to an orientation substantially perpendicular to the frame access 33. Deviation from that orientation, e.g., by moving the sander along the contours of the work surface, generates a reactionary force which urges the sanding surface into engagement with the working surface. Consequently, the user need not manually manipulate the angular orientation of the sander in order to facilitate the force acting to urge the sander against the working surface. The user may simply urge the sanding surface upwardly against the working surface, and move the sanding surface along the working surface, e.g., in an arcuate motion. The angular orientation of the sanding surface with respect to the working surface is effected by pivotal mounting of the sander and the resilient springs urging the sander to return to its normal biased position.

FIG. 2 illustrates an embodiment of the invention wherein the sander mechanism is floor supported. As shown therein the frame 11 extends from the sander 15 to floor mount 43, which rests on the floor 45. The frame 11 includes frame extenders or support posts 47, 49, coupled at post coupler 51. In the presently preferred embodiment the post members 47, 49 may be engageable to post coupler 51 to permit resilient, reciprocating travel therebetween, along post axis 33. Such resilient engagement sers to dampen vibration from the sander, and to facilitate maintenance of an upward force tokeep the sanding surface in contact with the working surface. The frame lower portion 53 is secured to floor mount 43.

FIG. 3 illustrates a belt mounted embodiment of the sanding mechanism. The upper portion of the sanding mechanism is preferably constructed as indicated above. However, the lower portion of the frame 11 includes cylindrical portions 55, 57, coupled to post support 47. Support members 55, 57 may again be formed to permit relative axial movement therebetween, similar to a shock absorber or pogo stick to allow the user 20 to maintain the sanding surface 19 against the working surface, and mitigate the translation of vibration to the user.

As shown in FIG. 3 the user 10 may be provided with a belt 60, which may be formed of elastomeric material, which is secured to frame receiving member 65 via fastener 63 engageable to aperture 65. The frame receiving member 65 may be provided with frame receiving collar 61 adapted to receive and support post member 57.

As described in connection with the previous embodiments, the embodiment of FIG. 3 functions to bias the sander surface 19 into a predetermined position, such that it will urge the sanding surface into contact with the working surface, as the sanding surface is displaced from its normal position to follow the contours of the work surface.

What is claimed is:

1. A resilient sanding mechanism for sanding contours of a working surface comprising:
   an elongate frame having a frame axis;
   a sander mechanism pivotally engaged to the frame, the sander mechanism having a sanding surface disposed distal to the frame; and
   resilient biasing apparatus engageable to the sander mechanism and to the frame, the resilient biasing apparatus being engaged at multiple locations around the sanding mechanism to selectively generate a biasing force in response to pivotal movement of the sanding mechanism for biasing the sanding mechanism sanding surface in a predetermined orientation with respect to the frame axis.

2. The sanding mechanism as recited in claim 1 wherein the resilient biasing apparatus comprises a plurality of springs.

3. The sanding mechanism as recited in claim 1 wherein the resilient biasing apparatus biases the sanding surface to an orientation substantially normal to the frame axis.

4. The sanding mechanism as recited in claim 1 wherein springs function to urge the sanding surface against the working surface as the sanding surface traverses the working surface.

5. The sanding mechanism as recited in claim 1 wherein the frame is resiliently compressible along the length thereof.

6. The sanding mechanism as recited in claim 1 further comprising handle apparatus engageable to the frame at a plurality of axially spaced locations along the frame.

7. The sanding mechanism as recited in claim 6 wherein the handle apparatus includes a handle coupling member for enabling selective rotational engagement of the handle apparatus to the frame.

8. The sanding mechanism as recited in claim 1 wherein the frame has a second end portion, and further comprising a frame support member pivotally engageable to the frame proximate the frame second end portion, the frame support member being operative to facilitate ground support of the sanding mechanism.

9. A manually operated sanding mechanism for sanding contours of a working surface comprising:
   a sander disposable against the work surface;
   a shaft body;
   a sander pivotal support apparatus for pivotally engaging the sander to the shaft body; and
   a sander biasing apparatus engaged to the sander pivotal support apparatus and the shaft body, for resilient engagement therebetween, the sanding biasing apparatus being engaged at multiple locations around the sander pivotal support apparatus to selectively generate a biasing force in response to pivotal movement of the sander pivotal support apparatus to urge the sander to a predetermined orientation relative the shaft body.

10. The mechanism as recited in claim 9 further comprising a shaft post normally extending from the shaft body, the shaft post being axially compressible to urge the sander towards the work surface.

11. The apparatus as recited in claim 9 further comprising at least one handle and an associated handle coupling member engageable to the shaft body at a plurality of locations along the length thereof.

12. The apparatus as recited in claim 11 wherein the handle coupling member is rotatable about the shaft body.

13. The apparatus as recited in claim 9 wherein the sander biasing apparatus comprises a plurality of resilient tension springs, each of said tension springs having a first end connected to the sander pivotal support apparatus and a second end engageable to the shaft body, the tension springs being cooperative to urge the sander to an orientation normal to the shaft body, such that the sander is urged into engagement with work surface contours.

14. The apparatus as recited in claim 13 further comprising a tension spring coupling member connected to the tension springs and translatable along the length of the shaft body for secure engagement thereto.

15. The apparatus as recited in claim 9 wherein the frame is extendable in length.

16. The sanding mechanism as recited in claim 1 wherein the sander mechanism pivots to counterbalance movement to urge the sander mechanism into substantially abutting contact with the working surface.

17. The apparatus as recited in claim 9 wherein the sander pivots to counterbalance movement to urge the sander into substantially abutting contact with the working surface.

* * * * *